March 17, 1936.  G. A. LUBURG  2,034,106
RETRACTABLE LANDING GEAR
Filed Jan. 23, 1934  2 Sheets-Sheet 1
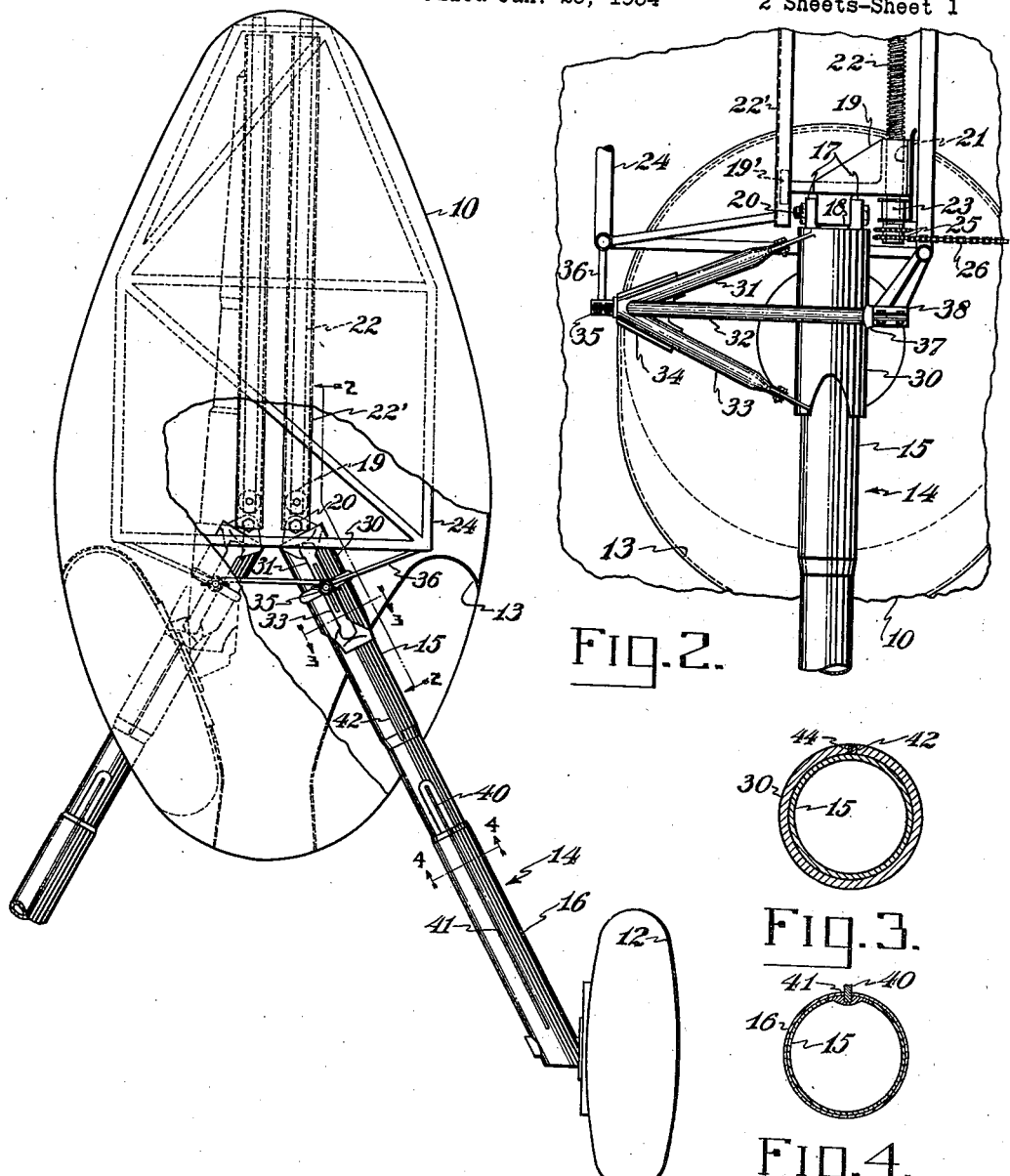
INVENTOR.
GUY A. LUBURG.
BY
ATTORNEYS.

March 17, 1936.   G. A. LUBURG   2,034,106
RETRACTABLE LANDING GEAR
Filed Jan. 23, 1934   2 Sheets-Sheet 2

INVENTOR.
Guy A. Luburg.
BY
ATTORNEYS.

Patented Mar. 17, 1936

2,034,106

UNITED STATES PATENT OFFICE 2,034,106

RETRACTABLE LANDING GEAR

Guy A. Luburg, Snyder, N. Y., assignor to Curtiss Aeroplane & Motor Company, Inc., a corporation of New York Application January 23, 1934, Serial No. 707,887

4 Claims. (Cl. 244—2)

This invention relates to improvements in retractable landing gears for aircraft.

An object of the invention is to provide a landing gear of the single strut type, wherein a wheel for ground contact is carried by a single strut extending downwardly and outwardly from the fuselage, and wherein mechanism is provided within the confines of the fuselage for drawing the single strut, with its wheel, to a position substantially within the fuselage and out of the air stream through which the craft is flying.

A further object is to provide adequate bracing means for holding the single strut against landing stresses, this means cooperating with the retracting mechanism whereby an extremely simple construction results.

A further object is to provide screw means for extending or retracting a landing gear, which screw means assume a portion of the landing stresses imposed upon the landing gear when extended.

A further object is to combine in the single strut of the landing gear, shock absorbing mechanism for the assumption of landing and taxiing loads.

Still another object is to provide means in a single shock absorber strut of the telescoping type, to prevent relative turning of the several movable parts of the strut, whereby the landing wheel may be maintained in fore and aft alignment.

Further objects will be apparent from a reading of the specification and claims and from a consideration of the drawings.

Generally, the landing gear of this invention is best applied to the fuselage of an aircraft, the landing gear comprising two relatively separate units, one for each side. Each unit comprises a single cylindrical strut of the telescoping type including shock absorbing mechanism well known in the art. The outer end of the strut carries a wheel for ground contact, while the inner end of the strut is slidably arranged in a strong sleeve which is trunnioned in suitable brackets extending from the fuselage structure. The upper end of the strut projects through the sleeve and is pivoted to a bracket, the bracket in turn being arranged for substantially vertical movement in fixed guides in the fuselage. A convenient means for translating the bracket upwardly and downwardly in the guides comprises a screw shaft engaging within a threaded portion of the bracket, whereby turning of the screw shaft raises or lowers the bracket, at the same time raising or lowering the landing gear strut and sliding it through the sleeve. The line of action of the guides is offset with respect to the sleeve trunnion, resulting in a change in angular position of the landing gear strut between positions of extension and retraction of the landing gear. In the extended position, the strut assumes an outwardly canted position, wherein the landing wheel at its lower terminus is vertical. As the strut is retracted by the means mentioned, the strut and wheel are gradually turned inwardly as they are drawn upwardly, so that, when retracted, the strut occupies a substantially vertical position within the fuselage and the wheel is tilted inwardly and downwardly to fit within a suitable pocket formed in the lower portion of the fuselage.

For a more detailed understanding of the invention, reference may be made to the appended drawings, in which similar numbers indicate similar parts, and in which:

Fig. 1 is a front elevation, partly broken away, of an aircraft fuselage embodying the landing gear of this invention;

Fig. 2 is a fragmentary enlarged section on the line 2—2 of Fig. 1;

Fig. 3 is an enlarged section on the line 3—3 of Fig. 1;

Fig. 4 is an enlarged section on the line 4—4 of Fig. 1;

Figure 5:
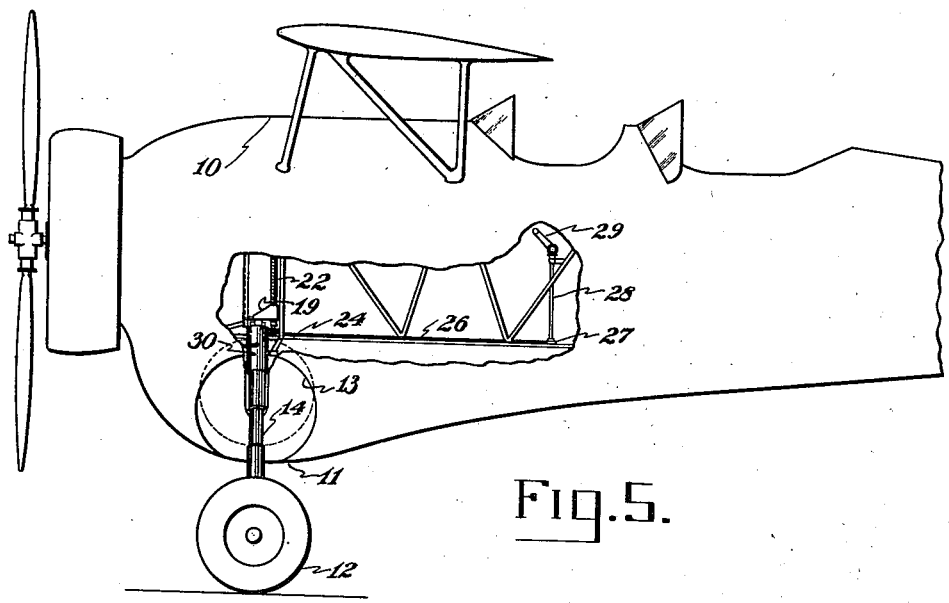
Fig. 5 is a side elevation, partly broken away, of an aircraft showing the landing gear in the extended position.

An aircraft fuselage 10, provided with the usual wings, engine, propeller and the like, is bellied downwardly at its forward portion as at 11, to provide a streamlined mass within which the wheels 12 of the landing gear may be housed when retracted. The portion 11 has pockets 13 formed therein, which pockets are complementary to the wheel contour, whereby, when retracted, the outer surface of the wheels may be substantially flush with the outer surface of the fuselage. It will be noted that the landing gear, as referred to in this specification, refers to one half of the landing gear—that is, the landing gear as embodied on one side of the plane of symmetry of the aircraft. The landing gear on the opposite side of the plane of symmetry is identical in every respect, so that a description of one will suffice for the other.

The landing gear comprises principally a single cylindrical strut 14 having an upper relatively fixed plunger portion 15 which is slidable within a cylindrical member 16 which carries the wheel 12. Suitable mechanism is enclosed between the plunger and cylinder for the absorption of shocks, any of several well known mechanisms of this character being adaptable for this purpose. The upper end of the strut 14 is provided with bosses 17 engaging a boss 18 of a bracket 19, the bosses 17 and 18 being retained in pivotal relation by means of a bolt 20. The bracket 19 is provided with a threaded bore 21 threadedly engaging a screw shaft 22, the latter being borne for rotation as at 23 in the fuselage skeleton 24. Sprockets 25 are provided on the screw shaft 22 over which a pair of chains 26 run, respectively, to the other half of the landing gear, and to a sprocket 27 at the lower end of an operating shaft 28, this operating shaft extending upwardly and into the aircraft cockpit and being provided with a crank 29 whereby the screw shafts may be rotated. It will be apparent that by rotating the screw shafts, the bracket 19, with the strut 14, is drawn upwardly or downwardly with respect to the fuselage. The bracket 19 is provided with a roller 19' at all times engaged in a channel-like track 22' arranged parallel to the screw shaft 22. The track guides the bracket 19, preventing turning thereof when the screw shaft is turned.

Figure 6:
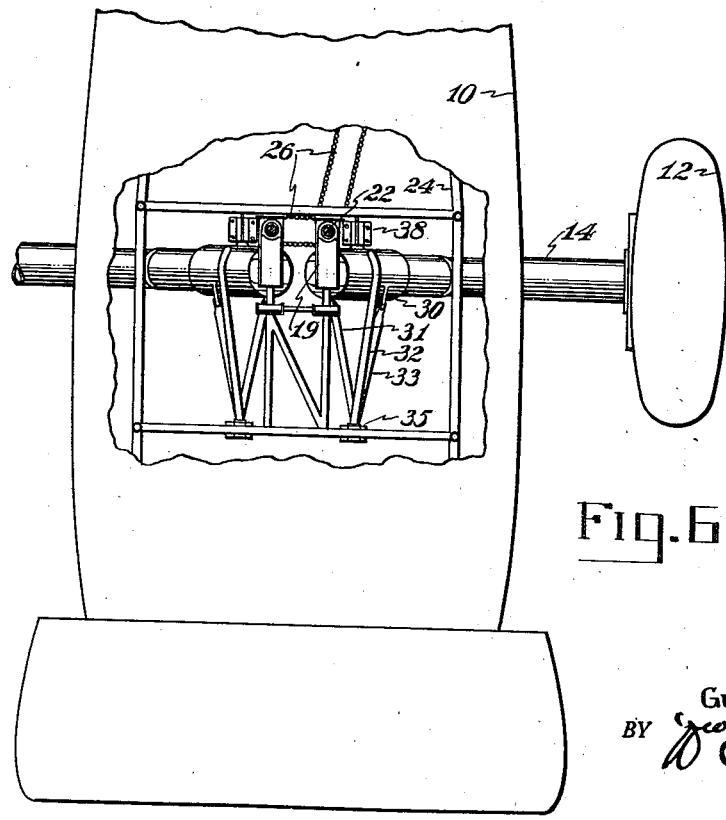
Fig. 6 is a plan, partly broken away, of the aircraft fuselage showing the landing gear in its extended position.

In order to restrain the landing gear to a definite path of motion, and to hold it when extended against landing and taxiing shocks, a sleeve 30 encircles the strut 14, the strut being slidable with respect to the sleeve. Said sleeve, as clearly shown in Figs. 2 and 6, is provided with a plurality of bracing members 31, 32 and 33, which converge to a fitting 34, trunnioned at 35 to rigid extensions 36 from the skeleton 24. The sleeve 30 is also provided with an opposite journal member 37 borne in a trunnion 38 also attached to the skeleton 24. The axes of the trunnions 35 and 38 are arranged in a fore and aft direction, whereby the sleeve 30 may rotate in a transverse plane, but is rigidly held in all other directions.

When the landing gear is in its extended position, the sleeve 30 with the bolt 20, will securely hold the strut 14 with its wheel 12 in an extended position below and extending outwardly from the fuselage. As the fitting 19 is drawn upwardly by the screw shaft 22, the strut 14 slides upwardly within the sleeve, simultaneously turning, with the sleeve, about the trunnions 35 and 38 through a small angle, so that, when the landing gear is fully retracted, the strut will lie wholly within the fuselage in a substantially vertical position as shown in dotted lines in Fig. 1. In this retracted position, the wheel 12 nests within the pocket 13 formed in the fuselage, the conformation of the wheel and pocket being such that the outer surface of the wheel will lie substantially flush with the outer surface of the fuselage when the landing gear is retracted.

In order that the strut 14 may be held from turning about its own axis, a key 40 is firmly attached to the lower portion of the plunger 15 to engage in a slot 41 formed in the wall of the cylinder 16. Likewise, a key 42 is attached to the upper portion of the plunger 15, to slidably engage a key-way 44 formed on the inner surface of the sleeve 30. The key 42 serves to hold the cylinder from rotation while the landing gear is extended and during extension or retraction. The key 40, on the lower portion of the plunger 15, serves to hold the cylinder 16 from turning when the wheel 12 contacts with the ground. The key 40, by its extension beyond the slot 41, engages the key-way 43 of the sleeve 30 when the landing gear is retracted.

It will be noted that an extension of the axis of the strut 14 intersects with the periphery of the wheel substantially at the point of ground contact thereof, this feature being clearly shown in Fig. 1. By this geometrical arrangement, a minimum of twisting tendency is imposed upon the several members of the landing gear, so that the keys 40 and 42 need not necessarily be of large dimensions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, a retractable landing gear comprising a sleeve having a substantially transverse axis trunnioned in said aircraft for oscillation, the trunnion axis being substantially normal to said sleeve axis, a single landing gear strut slidable in said sleeve and carrying a wheel for ground contact at its outer end, means for preventing turning of said strut in said sleeve about said sleeve axis, a guideway within said aircraft, a shoe translatable along said guideway, said shoe being pivotally connected to the inner end of said strut, and means for translating said shoe in said guideway.

2. In aircraft having a fuselage, in combination, longitudinally spaced trunnion pivots carried by the framework of said fuselage, a truss structure including a sleeve born for oscillation in said pivots, said sleeve having its axis substantially normal to the axis of said pivots and said sleeve lying wholly within said fuselage, a guideway within said fuselage and lying substantially in the plane of oscillation of said sleeve, a shoe slidable in said guideway, a single landing gear strut slidable with respect to and oscillatable with said sleeve and having a pivotal connection with said shoe, and a ground contact element carried by said strut.

3. In a retractable landing gear for aircraft, a sleeve trunnioned in said aircraft, braces for said sleeve to resist forces imposed thereon in planes coincidental with the axis of said trunnions, a landing gear strut slidable in said sleeve, a ground contact element mounted at the outer end of said strut, and means acting at the inner end of said strut for translating said strut relative to said sleeve and for resisting forces imposed thereon in planes other than the said planes coincidental with the trunnion axis.

4. In a retractable landing gear for aircraft, a cantilever strut carrying a wheel for ground contact, a sleeve swingably mounted on said aircraft within which said strut slidably engages, means for sliding said strut with respect to said sleeve, and means for constraining the end of said strut to a predetermined path of movement during sliding thereof with respect to said sleeve.

GUY A. LUBURG.